(12) United States Patent
Haramaty et al.

(10) Patent No.: US 11,625,644 B1
(45) Date of Patent: Apr. 11, 2023

(54) MULTI-OBJECTIVE RANKING OF SEARCH RESULTS

(71) Applicant: Amazon Technologies, Inc., Seattle, WA (US)

(72) Inventors: Elad Haramaty, Tirat Carmel (IL); Liane Lewin-Eytan, Binyamina (IL); David Carmel, Haifa (IL); Arnon Lazerson, Kibbuz Ein-Carmel (IL)

(73) Assignee: AMAZON TECHNOLOGIES, INC., Seattle, WA (US)

( * ) Notice: Subject to any disclaimer, the term of this patent is extended or adjusted under 35 U.S.C. 154(b) by 476 days.

(21) Appl. No.: 16/793,233

(22) Filed: Feb. 18, 2020

(51) Int. Cl.
*G06N 20/00* (2019.01)
*G06F 16/2457* (2019.01)
*G06N 7/01* (2023.01)

(52) U.S. Cl.
CPC ....... *G06N 20/00* (2019.01); *G06F 16/24578* (2019.01); *G06N 7/01* (2023.01)

(58) Field of Classification Search
CPC .............................. G06N 20/00; G06N 7/005
USPC ............................................................. 707/723
See application file for complete search history.

(56) References Cited

U.S. PATENT DOCUMENTS

| | | | | |
|---|---|---|---|---|
| 9,818,142 B2* | 11/2017 | Wang | ................ | G06F 16/24578 |
| 10,642,905 B2* | 5/2020 | Gusev | .................... | G06N 20/00 |
| 2011/0173183 A1* | 7/2011 | Dasdan | ................. | G06F 16/951 |
| | | | | 707/723 |
| 2012/0078825 A1* | 3/2012 | Kulkarni | ........... | G06F 16/24578 |
| | | | | 706/12 |
| 2012/0158623 A1* | 6/2012 | Bilenko | ................. | G06N 20/00 |
| | | | | 706/12 |
| 2015/0324690 A1* | 11/2015 | Chilimbi | ................ | G06N 3/063 |
| | | | | 706/27 |

OTHER PUBLICATIONS

Martin Abadi, Ashish Agarwal, Paul Barham, Eugene Brevdo, Zhifeng Chen, Craig Citro, Greg S. Corrado, Andy Davis, Jeffrey Dean, Matthieu Devin, Sanjay Ghemawat, Ian Goodfellow et al."TensorFlow: Large-Scale Machine Learning on Heterogeneous Distributed Systems", Nov. 9, 2015, Google AI, pp. 1-19. (Year: 2015).*

Bolei Zhou, Aditya Khosla, Agata Lapedriza, Aude Oliva, and Antonio Torralba, "Learning Deep Features for Discriminative Localization", Dec. 14, 2015, arXiv, pp. 1-10. (Year: 2015).*

* cited by examiner

*Primary Examiner* — Hai Tran
(74) *Attorney, Agent, or Firm* — K&L Gates LLP

(57) ABSTRACT

Devices and techniques are generally described for ranking of search results based on multiple objectives. In various examples, a first set of search results may be determined. A first objective and a second objective for ranking the first set of search results may be determined. A first label associated with the first objective may be selected for a first training data instance. A second label associated with the second objective may be selected for a second training data instance. A first machine learning model may be generated using the first training data instance and the second training data instance. In some examples, the first machine learning model may be effective to rank the first set of search results based at least in part on the first objective and the second objective.

18 Claims, 7 Drawing Sheets

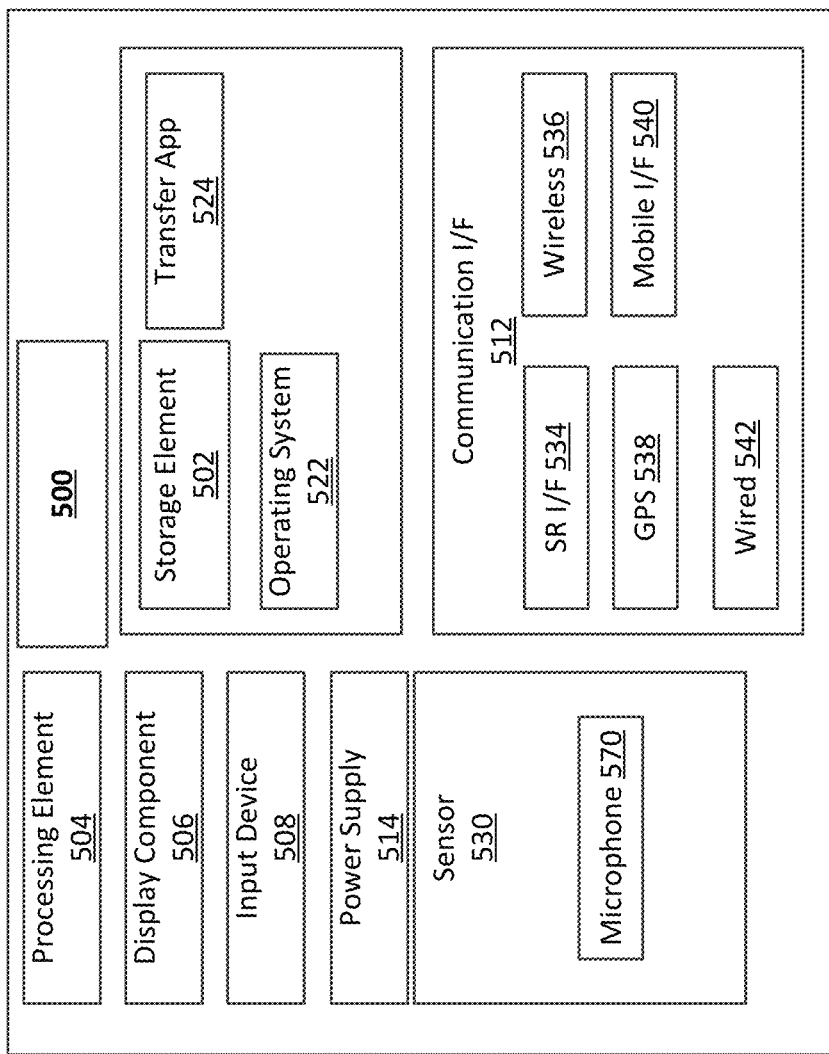

MULTI-OBJECTIVE RANKING OF SEARCH RESULTS

BACKGROUND

Machine learning models are often used to rank and order search results returned from search queries. Different objectives are often considered when determining how to rank search results. For example, historical behavior, business objectives, textual similarity to the search query, and latency of responses, among other objectives, can be used to determine how to rank search results for a particular search query. Parameters of machine learning models used to rank search results are often manually tuned in order to meet performance goals.

BRIEF DESCRIPTION OF DRAWINGS

FIG. 5 is a block diagram showing an example architecture of a computing device that may be used in accordance with various embodiments described herein.

DETAILED DESCRIPTION

Figure 1:
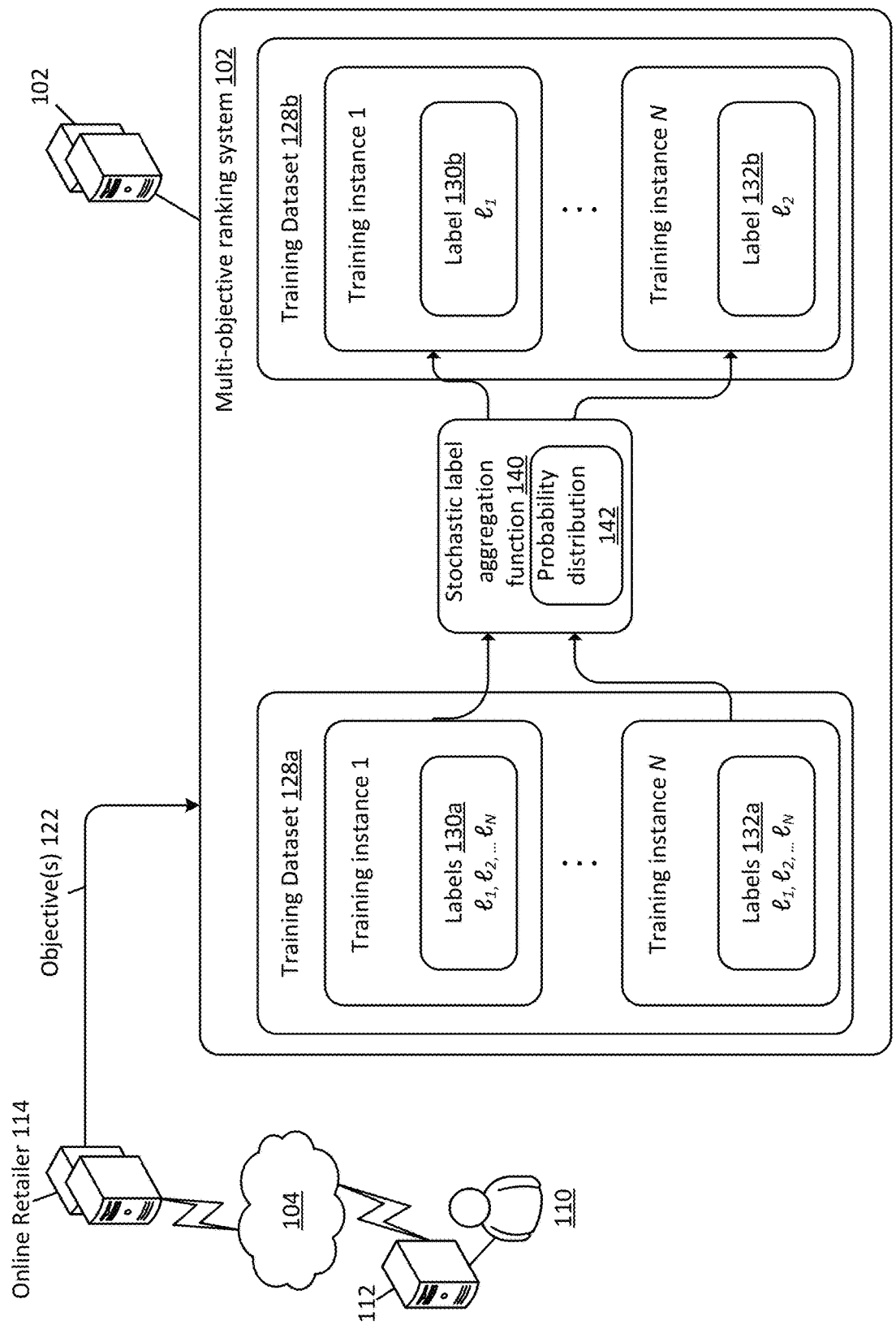
FIG. 1 is a block diagram illustrating stochastic label aggregation used in multi-objective ranking optimization, according to various embodiments of the present disclosure.

In the following description, reference is made to the accompanying drawings that illustrate several examples of the present invention. It is understood that other examples may be utilized and various operational changes may be made without departing from the scope of the present disclosure. The following detailed description is not to be taken in a limiting sense, and the scope of the embodiments of the present invention is defined only by the claims of the issued patent.

Learning a search-result ranking model for product searches (and/or other applications) may involve satisfying many specified objectives, such as, e.g., minimizing the likelihood of product returns, minimizing delivery time, maximizing the relevance of retrieved products with respect to the user query, maximizing the purchase likelihood of the returned list of products, etc. Multi-Objective Ranking Optimization (MORO) is the task of learning a ranking model from training examples while optimizing multiple objectives simultaneously.

Label aggregation is one approach for multi-objective optimization, which reduces the problem into a single objective optimization problem by aggregating the multiple labels of the training examples (each of the multiple labels being related to a different objective) to a single label. Several approaches for label aggregation are described herein. Further, as discussed in further detail below, a ranking model that is optimized for the reduced single objective problem using a deterministic label aggregation approach does not necessarily reach an optimal solution for the original multi-objective problem. Accordingly, described herein are stochastic label aggregation methods that randomly select a label per training example according to a given distribution over the different objectives' labels. A machine learning model may be optimized for multiple objectives by training the machine learning model using training data instances including the stochastically-aggregated labels.

As described herein, an optimal solution of the MORO problem can be generated by a proper parameter setting of the stochastic aggregation process. For example, as described in further detail below, MORO with stochastic label aggregation may provide a family of ranking models that fully dominates the set of MORO models built using deterministic label aggregation (as empirically demonstrated on various datasets in examples presented herein).

Product search provided by e-commerce sites is an important service allowing users to search for products which they can purchase, or upon which they can take some action, such as adding to their shopping cart, caching for future investigation, or exploring their attributes. Recently, product search has also been supported by intelligent voice assistants that enable the user to use a voice interface to search for products over online catalogs. Given a user query, the quality of the search results may be a leading factor in affecting user satisfaction in the e-commerce service. When quality signals are associated with training instances, either implicitly (e.g., through user behavioral data) or explicitly (e.g., through manual annotations) a Learning-to-Rank (LTR) approach is typically used to train a ranking model to rank search results. The model ranks the products with respect to the query, with the goal of achieving maximum agreement with the rank induced by the given quality signals (e.g., training instance labels), where agreement is typically measured by standard IR precision metrics such as normalized discounted cumulative gain (NDCG) or mean reciprocal rank (MRR). When more than one signal (e.g., more than one optimization objective) is given, an essential question arises, as to how should the signals be combined in order to optimize for search quality. Typical objectives that may be considered in product search may include semantic relevance of the results to the query, user engagement, search defects, product quality, product freshness, purchase likelihood, product quality, user rating, return rate, shipping time, etc.

Typically, for non-trivial multi-objective optimization problems, there is no feasible solution that maximizes all objective functions simultaneously. Therefore, Pareto optimal solutions are sought. Pareto optimal solutions are solutions that cannot be improved for one objective without degrading at least one of the other objectives. The set of Pareto optimal solutions for a given ranking model is often referred to as the Pareto frontier.

When the quality signals are given as graded labels (e.g., numerical scores, measures, and/or values related to a particular training objective), label aggregation is a popular multi-objective optimization method which reduces the multi-objective optimization problem to a single-objective optimization problem. A specific example is linear label aggregation, which generates a new label for each training example by a linear combination of the given labels. Then, a model is trained using a single-objective LTR algorithm based on the new aggregated labels. The advantage of this approach is the ability to exploit existing single-objective LTR frameworks for the case of the MORO problem. The optimality expectation is that an optimal solution for the resulting single-objective optimization problem would be on the Pareto Frontier of the multi-objective optimization problem.

Several label aggregation methods for MORO in product search are discussed herein. As described in further detail below, a ranking model that is optimized for the reduced single objective problem using a deterministic label aggregation approach does not necessarily reach an optimal solution for the original multi-objective problem. In various examples, deterministic label aggregation approaches may be capable of generating some Pareto-optimal solutions, but cannot cover the entire Pareto Frontier. By contrast, the stochastic label aggregation approaches described herein may generate a subset of models that cannot be dominated by any combination of models on the Pareto Frontier. To address this weakness, a stochastic label aggregation technique is described herein. The stochastic label aggregation technique randomly selects a label per training example according to a given distribution over the different labels. As described below, any existing model in this subset can be constructed by a proper parameter setting of the stochastic label aggregation process. Moreover, as described below, such indomitability does not hold in the case of deterministic aggregation. For example, a specific MORO problem with an existing Pareto-optimal solution that cannot be reached by any deterministic label aggregation method is described below.

In various examples, instead of stochastically selecting individual labels per-training instance from a single dataset, training instances may be sampled from multiple different datasets. For example, a first dataset may include training instances including a first label related to a first ranking objective and a second dataset may include training instances including a second label related to a second ranking objective. Training instances may be sampled from among the first dataset and the second dataset (according to a pre-defined probability distribution) and concatenated in order to generate a new, joint training dataset. Although there are two datasets in the foregoing example, any number of different datasets may be used. Additionally, each dataset may include training instances with multiple labels. However, in at least some examples, in the joint, combined dataset, each training instance may include only a single operative label.

Although the techniques described herein are principally discussed in reference to ranking of products in response to a product search, searching and ranking of search results is a broad discipline that encompasses many different applications. For example, web searches, searching of research databases, website searches, etc. are example applications of search result ranking. The various techniques described herein are applicable generally to any search function. However, for ease of illustration, the techniques are described herein with respect to e-commerce product searches. However, it should be appreciated that the computer-implemented techniques described herein are equally applicable to ranking of search results in any search context that includes multiple ranking objectives.

Single Objective Ranking Optimization

Training for a machine learning ranking algorithm in a single objective ranking optimization context is typically initiated with a set of n product related queries $Q=\{q_1, \ldots, q_n\}$; each $q \in Q$ is associated with a set of products $\mathbb{P}q=\{p_1, \ldots, p_{kq}\}$. Each product $p_i \in \mathbb{P}_q$ is represented as a query dependent feature vector, with a corresponding relevance label $l(q,p_i) \in [0, 1]$ that indicates the relevance of $p_i$ to query q. The 0 label represents a product that is irrelevant to query q, while 1 represents the highest relevance grade. Let $\mathbb{L}q=\{l(q, p_1), \ldots, l(q, p_{kq})\}$ be the labels of all products in $\mathbb{P}_q$. A training instance of the LTR task comprises the tuple $I=(q, \mathbb{P}_q, \mathbb{L}_q)$.

Let $\mathcal{A}$ denote a single-objective LTR algorithm with a fixed set of hyper parameters (e.g., number of trees in a gradient boosting tree (GBT) algorithm, tree depth, etc.). Given a sample of training instances $\mathcal{I}=\{I_1, \ldots, I_m\}$, the goal of $\mathcal{A}$ is to create a ranking model, $M(q, p)=\mathcal{A}(\mathcal{I})$, that scores a product p with respect to q, such that the ranking induced by the M scores over $\mathbb{P}_q$ has maximal agreement with $\mathbb{L}_q$. The loss function $Loss_l(I, M)$ gets as input a training instance I, together with the ranking model M, and estimates the disagreement between the orders induced by M and by $\mathbb{L}_q$ over $\mathbb{P}_q$. The cost function that $\mathcal{A}$ tries to minimize is $Cost_l(\mathcal{I}, M)=E_{I \in \mathcal{I}}[Loss_l(I, M)]$. When $\mathcal{I}$ is clear from the context we will denote the cost by $Cost_l(M)$. Generally, parameters of machine learning models may be updated in a supervised learning setting by minimizing a difference between a prediction of the machine learning model and a ground truth label of a training instance.

LambdaMart is an example LTR algorithm that is based on a pairwise cross-entropy loss function. The LambdaMart algorithm minimizes the cost function by iterative updates of the ranking model, an ensemble of gradient boosted decision trees, based on the approximation of the gradient of $Cost_l(M)$.

Multi-Objective Ranking Optimization

Typically for product search, there may be several optimization objectives. It may be assumed, without loss of generality, that there are two labeling objectives $l_1$ and $l_2$. In such a case, the goal may be to devise a ranking algorithm that learns a ranking model that minimizes the costs with respect to both objectives. Given a ranking model M, the loss function may be defined for each of the objectives in a similar manner to the single objective case $-Loss_{l_i}(I, M)$, $i \in \{1, 2\}$, and $Cost_{l_1,l_2}(M)=(Cost_{l_1}(M), Cost_{l_2}(M))$. Thus, there is only a natural partial order over the multiple objective costs, where $(Cost_{l_1}(M), Cost_{l_2}(M)) \leq (Cost_{l_1}(M'), Cost_{l_2}(M'))$ if and only if $Cost_{l_1}(M) \leq Cost_{l_1}(M')$ and $Cost_{l_2}(M) \leq Cost_{l_2}(M')$. Since typically there is no single model minimizing both objectives, many models can be considered "optimal," while each of them represents a different trade-off between the two objectives. Therefore, an optimal solution is based on the Pareto Frontier concept. A basic version of this concept may be defined as follows:

$\mathcal{M}$ denotes the set of all models that can be returned by an algorithm $\mathcal{A}$ for a given training set $\mathcal{I}$ (e.g., all models that can be returned by LambdaMart with a specific set of hyper-parameters). The Pareto Frontier of $\mathcal{M}$ is defined by:

$$\text{Par}(\mathbb{E})=\{M \in \mathcal{M} \mid \forall M' \in \mathcal{M}: Cost_{l_1,l_2}(M') \not< Cost_{l_1,l_2}(M)\}.$$

Multi-Objective Approaches

Multi-objective optimization is often based on three major approaches: (1) fusion of multiple models tuned independently for each objective; (2) reducing the problem to a single objective by aggregating multiple labels into a single one; and (3) the ϵ-constraint method which optimizes the primary objective while considering all other objectives as additional constraints on the solution. In the following we elaborate on these three approaches.

Model Fusion. Model fusion is based on the fusion of two independent ranking models. The first model $M_{l_1}$ is trained based on the first objective, while $M_{l_2}$ is trained independently based on the second objective. The final product score used for ranking is a convex combination of the two models scores. In particular, a linear combination is implemented by the formula $M(q,p) = \alpha \cdot M_{l_1}(q,p) + (1-\alpha) \cdot M_{l_2}(q,p)$, where the hyper parameter $\alpha \in [0, \ldots, 1]$ controls the trade-off between the two model scores.

Label Aggregation. This approach aggregates the labels representing multiple objectives to form one single label, which can then be used in an existing LTR framework to find a ranking model that optimizes the consolidated objective function. As specified before, given a query q, each product $p \in \mathbb{P}_q$ is associated with two different labels denoted by $l_1(p, q)$ and $l_2(p, q)$. The problem may be reduced into a single-objective learning-to-rank problem by aggregating the two labels of each product into one label. Two popular approaches for label aggregation are described below—lexicographic and linear approaches.

In a lexicographic approach, the labels $l_1$ and $l_2$ are prioritized. One label is selected as the primary label and the other label is selected as a secondary label. Products (or other search results) are ordered according to the primary label, while ties are broken according to the secondary label.

In a linear aggregation approach, for each (q, p) pair, a linear combination is used to compute a new label: $l(p, q) = \alpha \cdot l_1(p, q) + (1-\alpha) \cdot l_2(p, q)$. The order between a pair of products (or other search results) is derived from the new label l. The lexicographic approach is a special case of the linear approach, where $\alpha$ is chosen to be very close to 0 or to 1. Additionally, when $\alpha \in \{0, 1\}$, the problem is reduced to a single objective optimization.

$\epsilon$-constraint. Assuming $l_1$ is the primary objective, an optimization problem is solved to minimize $Cost_{l_1}(M)$ subject to $Cost_{l_2}(M) \leq \epsilon$. The $\epsilon$-constraint method is popular, especially in cases where the significance order between objectives is clear. However, it is easy to show that a solution provided by such a method is not necessarily on the Pareto Frontier. Moreover, existing LTR frameworks cannot be used in this case as the cost function should be re-implemented for supporting the additional constraints.

FIG. 1 is a block diagram illustrating stochastic label aggregation used in multi-objective ranking optimization of a multi-objective ranking system 102, according to various embodiments of the present disclosure. In various examples, an online retail customer 110 may use a computing device 112 to enter a search query to search for products available via an online retailer 114 (e.g., through one or more servers of an e-commerce service). As previously described, although ranking of product search queries are described in many of the following examples, the ranking techniques described herein are equally applicable to any computer-implemented search systems. In various examples, network 104 is a wide area network, such as the Internet, while in other embodiments, the network 104 is a local area network (LAN) over which search queries are sent and search results are returned. In some further embodiments network 104 is a combination of the Internet and a LAN.

The online retailer 114 may provide objectives 122 that may be used by multi-objective ranking system 102 to optimize a machine learning model used to rank search results. A training dataset 128a may include N training instances. Each training instance may comprise the tuple $I = (q, \mathbb{P}_q, \mathbb{L}_q)$ and $\mathbb{L}_q$ may comprise a label for each objective 122 for each product $\mathbb{P}_q$. For example, training instance 1 may include a set of products $\mathbb{P}_q$ associated with a query q. Each product in the set of products $\mathbb{P}_q$ may be associated with labels $l_1, l_2, \ldots l_N$ (where there may be a single label l for each of the objectives 122). For simplicity, labels $l_1$ and $l_2$ are referred to in the following examples. Although, it should be appreciated that any number of objectives 122 and any number of corresponding labels may be used in accordance with the embodiments described herein. A first objective may be to minimize delivery time, while a second objective may be maximizing user feedback. Accordingly, a first label $l_1$ may be a score $\in [0, 1]$ representing delivery time (e.g., with 0 being the shortest delivery time and 1 being the longest delivery time) and a second label $l_2 \in [0, 1]$ may be a score representing user feedback (e.g., with 0 representing a minimum user feedback score and 1 representing a maximum user feedback score).

In the example embodiment depicted in FIG. 1, training instance 1 including labels 130a and training instance N including labels 132a are input to stochastic label aggregation function 140. Stochastic label aggregation function 140 may select a label from among the labels of training instance 1 according to a probability distribution 142. Similarly, stochastic label aggregation function 140 may select a label from among the labels of training instance N according to the probability distribution 142. For example, in the two-label example of $l_1$ and $l_2$, the probability distribution 142 may specify that the label of all products in $\mathbb{P}_q$ will be $l_1$ with probability $\alpha$ and $l_2$ with probability $(1-\alpha)$. Accordingly, training dataset 128b may include approximately $\alpha \cdot |\mathcal{M}|$ training instances with results labeled by $l_1$ and $(1-\alpha) \cdot |\mathcal{M}|$ instances labeled by $l_2$. In the case of more than two labels, each label may be associated with a percentage with the total percentage across all labels summing to 100%. In the example depicted in FIG. 1, $l_1$ (e.g., label 130b) has been selected by stochastic label aggregation function 140 for training instance 1 and $l_2$ (e.g., label 132b) has been selected by stochastic label aggregation function 140 for training instance N. Accordingly, training dataset 128b includes training instances that follow the probability distribution 142, where each training instance 1 . . . N includes a selected, single label (as randomly selected by stochastic aggregation function 140 according to probability distribution 142). The training dataset 128b may be used to train a machine learning model using the single objective ranking optimization techniques described above.

The stochastic label aggregation approach has many advantages over deterministic approaches, as described in further detail below. Moreover, while deterministic label aggregation approaches rely on the assumption that all (q, p) pairs are fully labeled according to all objectives, in the stochastic case, a ranking model may be trained even if some of the training examples are only partially labeled by creating a representative training sample with queries labeled by $l_1$ and queries labeled by $l_2$ according to the desired probability distribution 142. For example, the relative proportions of training instances with label $l_1$ and label $l_2$ may conform to the proportions defined by the probability distribution 142. The scenario of partial labeling is quite common in practice, e.g., when only a small portion of the data is annotated with relevance labels due to the high cost of annotation.

Figure 2:
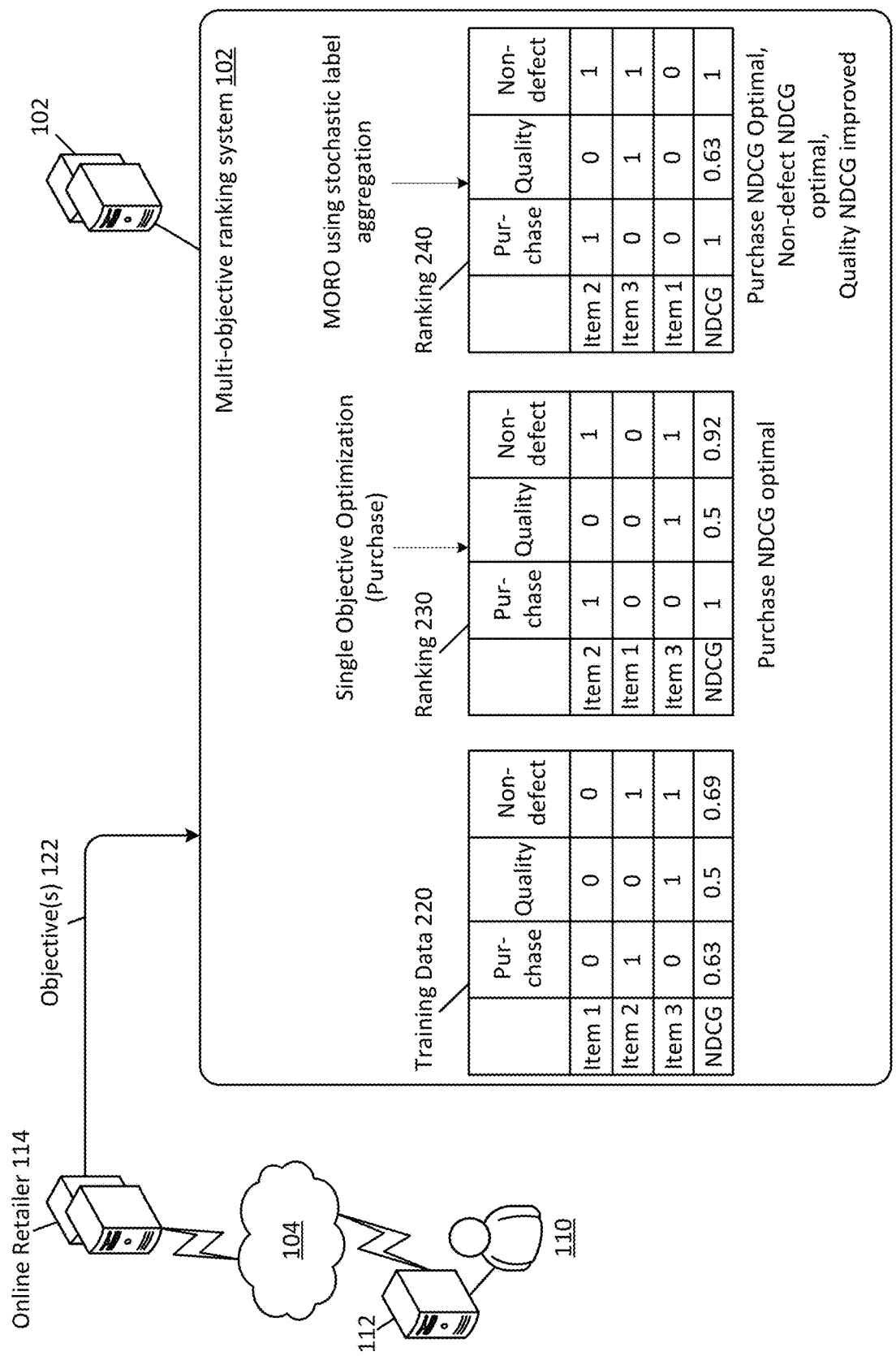
FIG. 2 is a block diagram illustrating different search rankings resulting from different optimization techniques, in accordance with various embodiments of the present disclosure.

FIG. 2 is a block diagram illustrating different search rankings resulting from different optimization techniques, in accordance with various embodiments of the present disclosure.

In the example embodiment depicted in FIG. 2, online retail customer 110 has performed a search using an e-commerce service of online retailer 114 for a product and/or product category. Multi-objective ranking system 102 has trained a first machine learning model using a single objective optimization technique with training data 220 to generate ranking 230. In the example depicted in FIG. 2, ranking 230 may be generated by a model optimized with respect to purchase likelihood using single objective optimization. Additionally, in FIG. 2 a second machine learning model may be generated using MORO with stochastic label aggregation to generate ranking 240 from training data 220. Rankings 230, 240 represent a ranked list of search results based on a query from online retail customer 110.

Training data 220 describes three items (Item 1, Item 2, and Item 3) with attributes for Purchase (e.g., 1 for previously purchased, 0 for not previously purchased), Quality (e.g., 1 for a quality above a threshold quality score, 0 for quality below the threshold quality score), and non-defective (e.g., 0 for a search result deemed defective relative to the query and 1 for a non-defective result for the query). The NDCG for the current ranking (Item 1, followed by Item 2, followed by Item 3) is shown below each objective. NDCG is a metric of the ranking algorithm's effectiveness with 0 being a poor result and 1 being an optimal result.

Ranking 230 represents a ranking optimized for purchase alone using single objective optimization. In other words, the ranking model for ranking 230 ranks products that have been previously purchased by online retail customer 110 (or by other similar customers) higher relative to products that have not been purchased previously. Multi-objective ranking system 102 optimizes using a cost function based on the purchase objective alone in ranking 230. Accordingly, NDCG is optimal for purchase in ranking 130. Ranking 230 ranks Item 2 above Items 1 and 3, as Item 2 has been previously purchased. Ranking 230 may be generated using any desired ranking algorithm (e.g., bipartite ranking, k-partite ranking, gradient boosting trees, etc.) optimized for purchase. Objective(s) 122 may be sent from online retailer 114 to the multi-objective ranking system 102.

Ranking 240 represents a ranking with multiple objectives. In ranking 240, the stochastic label aggregation techniques described herein may be used to optimize based on multiple objectives 122 (e.g., purchase, quality, and non-defective). Accordingly, as shown in ranking 240, purchase and non-defect are NDCG optimal, while quality has been improved from 0.5 NDCG in ranking 130 to 0.63 NDCG in ranking 240.

Figure 3:
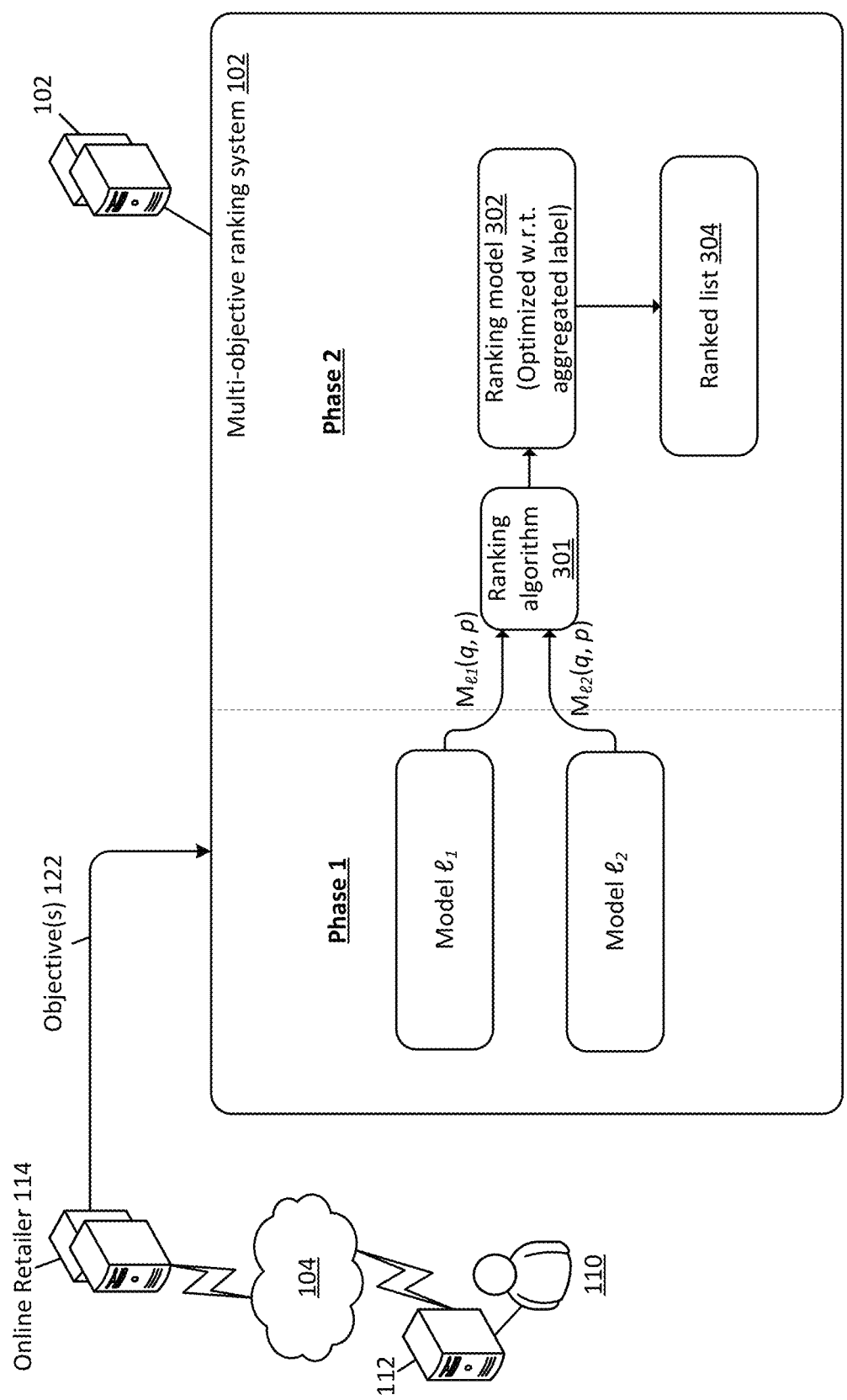
FIG. 3 depicts a block diagram illustrating a two phase combination of ranking models, in accordance with various embodiments of the present disclosure.

FIG. 3 depicts a block diagram illustrating a two phase combination of ranking models, in accordance with various embodiments of the present disclosure. In various example embodiments, another MORO approach may integrate label aggregation and model fusion. Initially, in a first phase, two independent models (Model $l_1$ ("$M_{l_1}$") and Model $l_2$ ("$M_{l_2}$")) may be trained, as in the model fusion approach. $M_{l_1}$ may be optimized based on the first objective, while $M_{l_2}$ may be optimized based on the second objective. In the second phase, ranking algorithm 301 may receive the $M_{l_1}$ (q, p) scores and $M_{l_2}$ (q, p) scores output by $M_{l_1}$ and $M_{l_2}$ and may generate ranking model 302. Ranking model 302 may be a machine learning model that may consider $M_{l_1}$ (q, p) scores and $M_{l_2}$ (q, p) scores as features of the (q, p) pair. Training in the second phase may be based on these two features using the ranking algorithm 301, and may be optimized with respect to a new aggregated label, computed by combining the labels $l_1$ with $l_2$ using any of the aggregation methods described previously. Ranking model 302 may generate ranked list 304 for a given query q and a given set of search results/products p.

In various examples, the two-phase approach may provide a strong optimization mechanism that may outperform the single-phase label aggregation methods. Moreover, while a single-phase mechanism aggregates the different objectives by constructing a single label, the two-phase mechanism integrates the different objectives via the internal representation of each of the training instances (as provided to the second phase). Thus, the learning algorithm of the two-phase mechanism may benefit from possible relationships between the objectives that are reflected while comparing between training instances.

Theoretical Analysis

Solution Concept

Figure 4A:
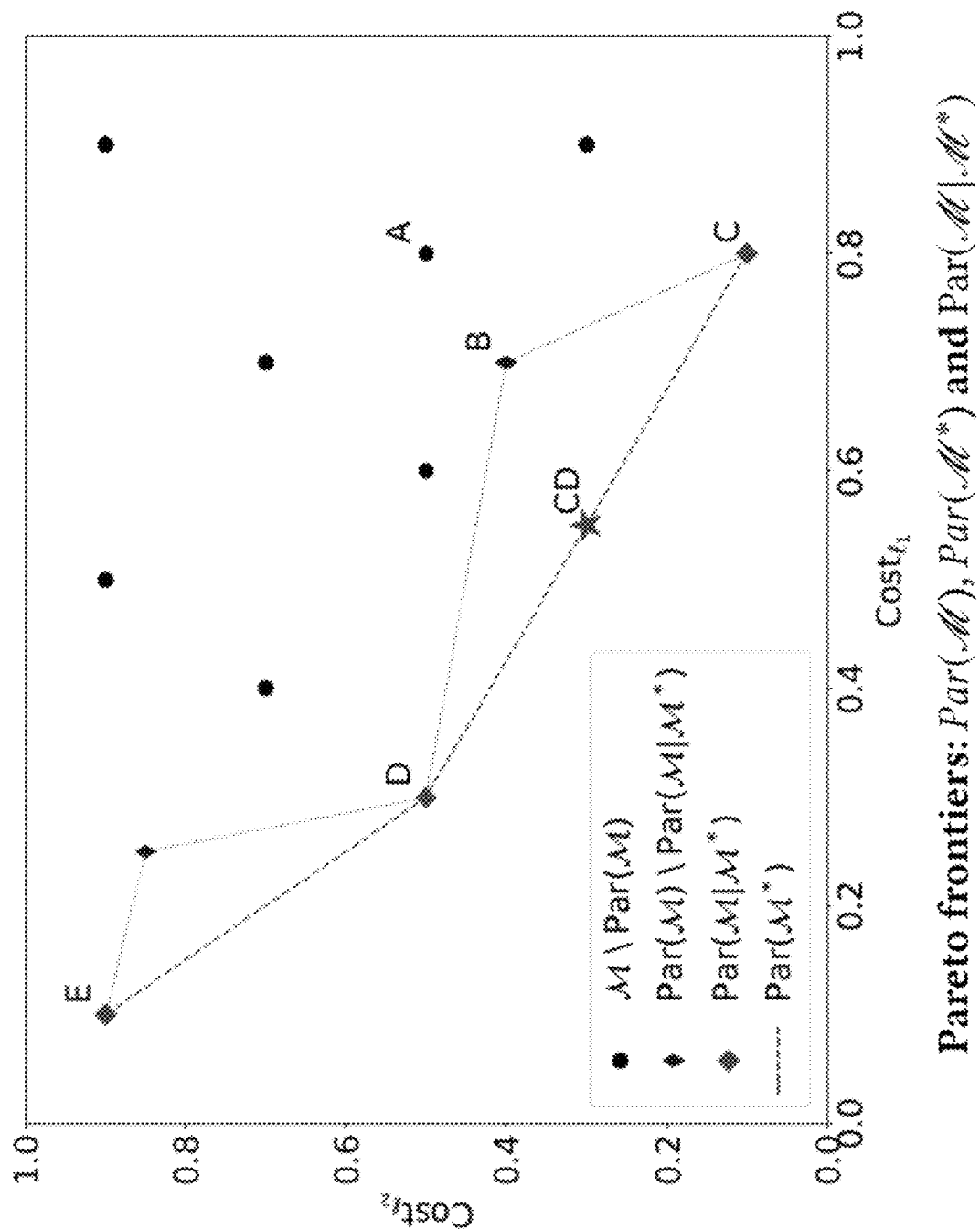
FIG. 4A depicts a scatter plot of costs for two different objectives for various different ranking models, in accordance with various embodiments of the present disclosure.

In order to present the theoretical advantage of stochastic aggregation over deterministic aggregation approaches, the concept of a solution for a MORO problem is extended. FIG. 4A illustrates the costs of some models and the relations between them. The Y axis represents the cost associated with the objective/label $l_2$ and the X axis represents the cost associated with the objective/label $l_1$. $Cost_{l_1, l_2}$ (M) is represented by a point on the graph. Model A is not on the Pareto Frontier of $\mathcal{M}$, since model B has a lower cost on both axes (objectives). Hence, any cost-minimizing decision maker will prefer B over A. Since B is on the Pareto Frontier of $\mathcal{M}$, there is no single model in $\mathcal{M}$ that outperforms B.

Random Models. Given two models, each with a lower cost on a different objective (e.g., models C and D in FIG. 4A), a model CD may be preferred where the model CD has a cost equal to the average cost of C and D. Given any two (or more) models, one can easily construct a model that achieves any convex combination of their costs, using a random model combination defined as follows.

A random model M* is defined by a probability distribution D over $\mathcal{M}$. For any (q, p) pair, M*(q, p) will return the output of a model in $\mathcal{M}$, chosen randomly with respect to D. Naturally, the support of M* is the set of all models from al with positive probability according to D. The next proposition shows that a random model achieves the expected cost of the models in its support.

PROPOSITION 1. Let M* be a random model, and let D(M*) be the probability distribution over $\mathcal{M}$ used to construct M*. Then, for any objective l, $Cost_l(M^*) = \mathbb{E}_{M \sim D(M^*)}[Cost_l(M)]$.

PROOF. The proof follows directly from the low of total expectation:

$$Cost_l(M^*) = \mathbb{E}_{I \in \mathcal{I}}([Loss_l(I, M^*)]$$

$$= \mathbb{E}_{M \sim D(M^*)}[\mathbb{E}_{I \in \mathcal{I}}([Loss_l(I, M)]] = \mathbb{E}_{M \sim D(M^*)}[Cost_l(M)].$$

$\mathcal{M}^*$ denotes the set of all random models over $\mathcal{M}$. From the above proof, $\mathcal{M} \subseteq \mathcal{M}^*$. Note also that since the cost of the random model can be directly computed from the costs of the deterministic models in its support, the random models need not be explicitly constructed in order to compute their costs. A random model may be selected based on the costs of the deterministic models. Therefore, based on the costs of models C and D, model CD (in FIG. 4A) may be preferred over model B. Additionally, in the case of one objective, there is no reason to consider random models. In this case, combining the cost-minimizing model with any other model does not provide additional value.

Optimal Solutions. The set of optimal solutions for the reduced single-objective problem, Par ($\mathcal{M}$), may contain models that are non-optimal for the original multi-objective problem, due to random models that may dominate them (e.g., Model CD in FIG. 4A which dominates model B). The set of optimal solutions for the multi-objective problem are characterized based on the notion of Pareto Frontier and random models. The goal is to identify all models in Par ($\mathcal{M}$) that are not dominated by any random model in $\mathcal{M}$*. Formally, we generalize the aforementioned definition of Pareto Frontier by Par($\mathcal{M}$|, $\mathcal{M}$*)=

{M∈ $\mathcal{M}$ |∀M*∈ $\mathcal{M}$ *:Cost$_{l_1,l_2}$(M*)≮Cost$_{l_1,l_2}$(M)}.

The next proposition shows that any random model in $\mathcal{M}$ * is dominated by a random model that is supported by only two models from Par($\mathcal{M}$|$\mathcal{M}$ *), and that can thus be efficiently computed. This demonstrates that Par($\mathcal{M}$|$\mathcal{M}$ *) is indeed a strong solution concept.

PROPOSITION 2. For any M*∈ $\mathcal{M}$ * there exists a random model M*'∈ $\mathcal{M}$ *, supported by two models {M$_1$,M$_2$}∈ Par($\mathcal{M}$|$\mathcal{M}$ *) such that Cost$_{l_1,l_2}$(M*')≤Cost$_{l_1,l_2}$(M*).

PROOF:

Model M dominates model M' if Cost$_{l_1,l_2}$(M)≤Cost$_{l_1,l_2}$(M'). The domination is strict, if Cost$_{l_1,l_2}$(M)<Cost$_{l_1,l_2}$(M'). For M∈ $\mathcal{M}$ *, the set of all models in its support is denoted by $\mathcal{M}_M$.

The goal is to show that any model M*∈ $\mathcal{M}$ * is dominated by a model M*' that is supported by two models from Par($\mathcal{M}$|$\mathcal{M}$ *). The following proof is provided in two stages. In the first stage it is shown that M* is dominated by a model M*" that satisfies $\mathcal{M}_M$*"⊆Par($\mathcal{M}$|$\mathcal{M}$ *). In the second stage it is shown that M*" is dominated by a model M*' supported by two models from Par($\mathcal{M}$|$\mathcal{M}$ *).

First stage: Let M*∈ $\mathcal{M}$ *. M*" is constructed by an iterative process. As shown below, if there is a model M∈ $\mathcal{M}$ * such that $\mathcal{M}_M$⊈Par($\mathcal{M}$|$\mathcal{M}$ *), then there is a model M'∈ $\mathcal{M}$ * that strictly dominates M. Therefore, in each iteration, if $\mathcal{M}_M$*⊈Par($\mathcal{M}$|$\mathcal{M}$ *), then it is replaced by a model that strictly dominates it. This process is repeated until convergence to a model M*" that dominates M*, and $\mathcal{M}_M$*"⊆Par($\mathcal{M}$|$\mathcal{M}$ *).

It is shown that if M∈ $\mathcal{M}$ * and $\mathcal{M}_M$ ⊈Par($\mathcal{M}$|$\mathcal{M}$ *) then there is a model that strictly dominates it. Let M1∈ $\mathcal{M}_M$ \Par($\mathcal{M}$|$\mathcal{M}$ *). Since M$_1$<Par($\mathcal{M}$|$\mathcal{M}$ *), there exists a model M$_2$∈ $\mathcal{M}$ * that dominates M$_1$. Since M1∈ $\mathcal{M}_M$, there is a positive probability p>0 of selecting M$_1$ according to D(M). Consider the random model M', construed according to the distribution D(M), while replacing M$_1$ (if selected) with a model selected according to D(M$_2$). By proposition 1, we get Cost$_{l_1,l_2}$ (M')=Cost$_{l_1,l_2}$ (M)−p·(Cost$_{l_1,l_2}$ (M$_1$)−Cost$_{l_1,l_2}$ (M$_2$))<Cost$_{l_1,l_2}$ (M), as required.

Second stage: Let M*" be the model constructed in the first stage. By an additional iterative process, a model M*' is constructed that dominates M*", while being supported by only two models in Par($\mathcal{M}$|$\mathcal{M}$ *). In each iteration there is a model M, such that $\mathcal{M}_M$ ⊆Par($\mathcal{M}$|$\mathcal{M}$ *). If |$\mathcal{M}_M$|>2. As shown below, a model M' exists that dominates M, $\mathcal{M}_M$'⊆Par($\mathcal{M}$|$\mathcal{M}$ *), and |M$_{M'}$|<|M$_M$|. Thus, upon convergence of the iterative process, a model M*' is determined that dominates M*" (and therefore dominates M*) and is supported by only two models from Par($\mathcal{M}$|$\mathcal{M}$ *).

Let M be a model such that $\mathcal{M}_M$ ⊆Par($\mathcal{M}$|$\mathcal{M}$ *)* and |$\mathcal{M}_M$|>2. Let M$_1$∈ $\mathcal{M}_M$ be the model that minimizes Cost$_{l_1}$ in $\mathcal{M}_M$ and $\mathcal{M}_2$ be the model that maximizes Cost$_{l_1}$ in $\mathcal{M}_M$. By the above assumption, there exists a third model M$_3$∈ $\mathcal{M}_M$ \{M$_1$, M$_2$} such that Cost$_{l_1}$ (M$_3$)∈ [Cost$_{l_1}$ (M$_1$), Cost$_{l_1}$ (M$_2$)]. Let β∈[0, 1] be the solution for the following equation, Cost$_{l_1}$ (M$_3$)=β·Cost$_{l_1}$ (M$_1$)+(1−β)·Cost$_{l_1}$ (M$_2$). M' is constructed, as follows:

Let p$_1$,p$_2$,p$_3$ the probabilities of choosing M$_1$,M$_2$,M$_3$ according to D(M) and let $$p = \min\left\{\frac{p_1}{\beta}, \frac{p_2}{1-\beta}\right\}.$$

D(M') is defined to be the same as D(M), except that the probabilities of selecting M$_1$,M$_2$,M$_3$ according to D(M') are p1−βp,p2−(1−β)p and p3+p, respectively.

By the choice of p, there are only two options: p1−βp=0 and thus M1∉ $\mathcal{M}_{M'}$; or p2−(1−β)p=0 and thus M$_2$∉ $\mathcal{M}_{M'}$. Since the support of M' does not include models outside of $\mathcal{M}_M$, |$\mathcal{M}_{M'}$|<|$\mathcal{M}_M$|.

In order to show that M' dominates M, M$_{1,2}$ is defined as the random model that selects M$_1$ with probability β and M$_2$ with probability 1−β. It is first shown that M$_{1,2}$ is dominated by M$_3$. By Proposition 1 and the choice of β, Cost$_{l_1}$ (M3)=Cost$_{l_1}$ (M$_{1,2}$). Thus, there is a dominance relationship between M$_3$ and M$_{1,2}$ that is determined by Cost$_{l_2}$. It follows that since M$_3$∈Par($\mathcal{M}$|$\mathcal{M}$ *), it cannot be dominated by M$_{1,2}$ and hence M$_3$ dominates M$_{1,2}$.

Finally, following Proposition 1, Cost$_{l_1,l_2}$ (M')=Cost$_{l_1,l_2}$ (M)−βpCost$_{l_1,l_2}$ (M$_1$)−(1−β)pCost$_{l_1,l_2}$ (M$_2$)+pCost$_{l_1,l_2}$ (M$_3$)=Cost$_{l_1,l_2}$ (M)−pCost$_{l_1,l_2}$ (M$_{1,2}$)+pCost$_{l_1,l_2}$ (M$_3$)≤Cost$_{l_1,l_2}$ (M).

That is, M' dominates M as required.

Looking again at model B∈Par($\mathcal{M}$) in FIG. 4A, it is asserted that a cost-minimizing decision maker may not choose model B since it is not on Par($\mathcal{M}$|$\mathcal{M}$ *). Indeed, for each training instance I, one can order the products according to model C, with probability 0.5, or according to model D, with probability 0.5. The point CD represents the costs of this random model which are lower than the costs of model B, with respect to both objectives. Therefore, the decision maker may prefer CD over B, hence B<Par($\mathcal{M}$|$\mathcal{M}$ *). The bottommost curve along E, D, CD, C represents Par($\mathcal{M}$ *), and the points that span it belong to Par($\mathcal{M}$|$\mathcal{M}$ *). Finally, it is noted that the decision maker may choose any model on the Pareto Frontier of $\mathcal{M}$ *, since there is no random model that outperforms them.

Optimality

Below, it is shown that the family of MORO models $\mathcal{M}_{stoch}$, constructed using stochastic label aggregation, is superior to the family of models $\mathcal{M}_{det}$ constructed using deterministic label aggregation. In order to establish the proof, it is shown that $\mathcal{M}_{stoch}$ equals Par($\mathcal{M}$|$\mathcal{M}$ *), while $\mathcal{M}_{det}$ does not.

Let l$_α$ be a stochastic label, i.e., the final label resulting from choosing $_{l1}$ with probability α and choosing $_{l2}$ with probability 1−α, where the probabilities are independent over the training instances. Let Cost$_{l_α}$ (M) be the (single-objective) cost function of model M according to l$_α$. The following proposition defines the relation between Cost$_{l_α}$ (M) and Cost$_{l_1,l_2}$ (M).

PROPOSITION 3. Given $\vec{α}$=(α, 1−α), then Cost$_{l_α}$ (M)= $\vec{α}$·Cost$_{l_1,l_2}$(M).

PROOF. Following directly from the law of total expectation:

Cost$_{l_α}$(M)=$\mathbb{E}_{I∈\mathcal{I}}$[Loss$_{l_α}$(I,M)]

=α·$\mathbb{E}_{I∈\mathcal{I}}$[Loss$_{l_1}$(I,M)]+(1−α)$\mathbb{E}_{I∈\mathcal{I}}$[Loss$_{l_2}$(I,M)]

=α·Cost$_{l_1}$(M)+(1−α)·Cost$_{l_2}$(M)=$\vec{α}$·Cost$_{l_1,l_2}$(M).

Optimality of Stochastic Label Aggregation

THEOREM 1. $\mathcal{M}_{stoch}=\text{Par}(\mathcal{M} \mid \mathcal{M}^*)$.

PROOF. A bi-directional set inclusion is shown. That is, $\mathcal{M}_{stoch} \subseteq \text{Par}(\mathcal{M} \mid \mathcal{M}^*)$ and $\text{Par}(\mathcal{M} \mid \mathcal{M}^*) \subseteq \mathcal{M}_{stoch}$.

$\mathcal{M}_{stoch} \subseteq \text{Par}(\mathcal{M} \mid \mathcal{M}^*)$: A model $M\alpha \in \mathcal{M}_{stoch}$ is considered that minimizes $\text{Cost}_{l_\alpha}$ and it is shown that no other model $M' \in \mathcal{M}^*$ has a lower cost in both objectives, i.e., $\text{Cost}_{l_1,l_2}(M') \not< \text{Cost}_{l_1,l_2}(M_\alpha)$. Indeed, if there is such a model $M'$, then $\vec{\alpha} \cdot \text{Cost}_{l_1,l_2}(M') < \vec{\alpha} \cdot \text{Cost}_{l_1,l_2}(M_\alpha)$. By Proposition 3, $\text{Cost}_{l_\alpha}(M') < \text{Cost}_{l_\alpha}(M_\alpha)$, in contradiction to the optimality of $M_\alpha$ with respect to $\text{Cost}_{l_\alpha}$. Therefore, $M_\alpha \in \text{Par}(\mathcal{M} \mid \mathcal{M}^*)$.

$\text{Par}(\mathcal{M} \mid \mathcal{M}^*) \subseteq M_{stoch}$: a model $M \in \text{Par}(\mathcal{M} \mid \mathcal{M}^*)$ is considered and the existence of $\alpha \in [0, 1]$ is shown, such that M minimizes $\text{Cost}_{l_\alpha}$, and therefore $M \in \mathcal{M}_{stoch}$.

Sub-Optimality of Deterministic Label Aggregation.

The next proposition shows that $\mathcal{M}_{det}$ does not cover $\text{Par}(\mathcal{M} \mid \mathcal{M}^*)$, and thus is inferior to $\mathcal{M}_{stoch}$.

PROPOSITION 4. $\text{Par}(\mathcal{M} \mid \mathcal{M}^*) \not\subseteq \mathcal{M}^*_{det}$.

PROOF. A simple training sample $\mathcal{S}$ is described, and the existence of a model in $\text{Par}(\mathcal{M}^*)$ is shown such that any model returned by a deterministic aggregation method has a considerably higher cost value in at least one of the objectives.

Two queries $q_1$, $q_2$, are considered, with each query associated with two products, $\mathbb{P}_{q1}=\{a, b\}$ and $\mathbb{P}_{q2}=\{c, d\}$. Each product has two binary labels, $l_1$, $l_2$. The training sample $\mathcal{S}$ consists of 100 training instances: 91 instances associated with query $q_1$, and 9 instances with query $q_2$. Table 1 summarizes sample $\mathcal{S}$.

TABLE 1

Proposition 4: the training sample

| #I | q | $\mathbb{P}q$ | $l_1$ | $l_2$ |
|---|---|---|---|---|
| (1) 90 | $q_1$ | a | 1 | 1 |
| | | b | 1 | 0 |
| (2) 1 | $q_1$ | a | 0 | 1 |
| | | b | 1 | 0 |
| (3) 5 | $q_2$ | c | 1 | 1 |
| | | d | 1 | 0 |
| (4) 4 | $q_2$ | c | 0 | 1 |
| | | d | 1 | 0 |

$\mathcal{M}_{x\triangleleft y, u\triangleleft v}$ is marked for models that rank x on top of y and u on top of v. All ranking models consistent with the sample can be classified into four equivalent classes $\mathcal{M}_{a\triangleright b, c\triangleright d}$, $\mathcal{M}_{a\triangleleft b, c\triangleleft d}$, $\mathcal{M}_{a\triangleleft b, c\triangleleft d}$ and $\mathcal{M}_{a\triangleright b, c\triangleright d}$. It is assumed that $\mathcal{M}$ contains a representative of each of the aforementioned classes. Without loss of generality, it is assumed that the cost of ordering a pair in the wrong order is 1. Consider $M \in \mathcal{M}_{a\triangleright b, c\triangleright d}$. By looking at all 4 types of labeled instances, M ranks the products in the correct order according to $l_1$ and in the wrong order according to $l_2$, thus $\text{Cost}_{l_1}(M)=0$ and $\text{Cost}_{l_2}(M)=1$. Now consider $M \in \mathcal{M}_{a\triangleleft b, c\triangleleft d}$. It can easily be seen that a loss according to label 1 occurs only in cases (2) and (4), which together cover 5 out of 100 instances, thus $\text{Cost}_{l_1}(M)=0.05$ and $\text{Cost}_{l_2}(M)=0$. Table 2 summarizes the costs of each model class with respect to both labels, together with the instances in which the loss occurred.

Propisition 4, cost of all possible models

| M | $\text{Cost}_{l_1}$ (M) | $\text{Cost}_{l_2}$ (M) | $\text{Loss}_{l_1} =$ 1 | $\text{Loss}_{l_2} =$ 1 |
|---|---|---|---|---|
| $a\triangleleft b, c$ $\triangleleft d$ | 0 | 1 | | (1),(2), (3),(4) |
| $a\triangleright b, c$ $\triangleright d$ | 0.05 | 0 | (2),(4) | |
| $a\triangleright b, c$ $\triangleleft d$ | 0.01 | 0.09 | (2) | (3),(4) |
| $a\triangleleft b, c$ $\triangleright d$ | 0.04 | 0.91 | (4) | (1),(2) |

It is shown that any learning algorithm with deterministic label aggregation can return only models from $\mathcal{M}_{a\triangleright b, c\triangleright d}$ or $\mathcal{M}_{a\triangleleft b, c\triangleleft d}$, while it cannot return any mode from $\mathcal{M}_{a\triangleleft b, c\triangleright d}$. Let $l: \{0, 1\} \times \{0, 1\} \rightarrow \mathbb{R}$ be a deterministic function that aggregates the two labels. The claim is proved by considering the following four cases:

(1) $l(1, 1) > l(1, 0)$. In this case ranking a above b will be wrong for at most 1 example out of the 91 examples associated with $q_1$, while ranking a below b will be wrong for 90 cases. Thus, a cost minimizing algorithm will always rank a above b. Similarly, this algorithm will rank c above d since it prefers to use the wrong order only for 4 examples rather than 5 examples. Thus, the only models that can be returned in this case belong to $\mathcal{M}_{a\triangleleft b, c\triangleleft d}$.

(2) $l(1, 1) < l(1, 0)$. Using the same argument as in Case (1), only models from $\mathcal{M}_{a\triangleright b, c\triangleright d}$ will be returned.

(3) $l(1, 1) = l(1, 0)$ and $l(0, 1) > l(1, 0)$. Ordering a above b and c above d is the only way to get zero cost and thus the only models that can be returned in this case are from $\mathcal{M}_{a\triangleleft b, c\triangleleft d}$.

(4) $l(1, 1) = l(1, 0)$ and $l(0, 1) < l(1, 0)$. Similarly to Case (3), the models returned will be from $\mathcal{M}_{a\triangleright b, c\triangleright d}$.

Figure 4B:
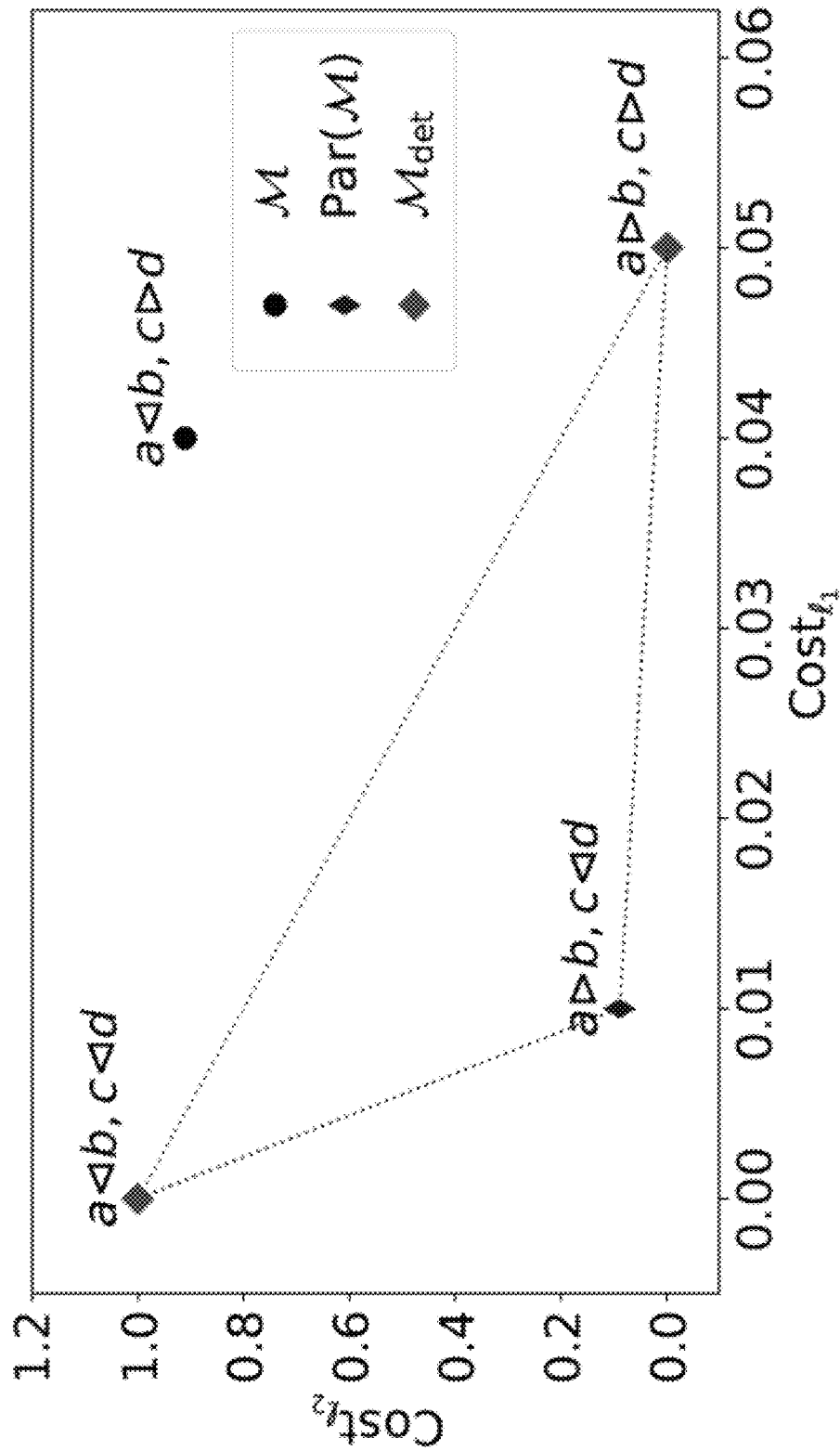
FIG. 4B depicts a plot of costs for two different objectives for stochastic label aggregation and deterministic label aggregation methods, in accordance with various aspects of the present disclosure.

FIG. 4B presents the costs of all consistent models with the training sample. As shown above, there is no deterministic label-aggregation method that can return a model from $\mathcal{M}_{a\triangleleft b, c\triangleleft d}$, which belongs to the Pareto frontier. On the other hand, by Theorem 1, the stochastic label aggregation method can output any model on the Pareto Frontier of problem, including those in $\mathcal{M}_{a\triangleleft b, c\triangleleft d}$, completing the proof.

FIG. 4B: Proposition 4: deterministic vs stochastic label aggregation costs

In the example above, for each query, the majority of instances agree on label $l_1$ (for $q_1$ the majority is 99%, while for $q_2$ it is 56%). Note that deterministic aggregation methods do not take into account the level of agreement on the label. This is due to the fact that ordering is determined according to the second label in any case of agreement on the first label, no matter what the level of agreement is. A stochastic method however, can output models where ordering is set with respect to the agreement level on the label. Additionally, when the granularity of label values is low (e.g., a binary label), it is noted that the level of agreement on the label value between instance pairs becomes higher.

FIG. 5 is a block diagram showing an example architecture 500 of a computing device used to implement multi-objective ranking system 102, in accordance with various aspects of the present disclosure. It will be appreciated that not all devices will include all of the components of the architecture 500 and some user devices may include additional components not shown in the architecture 500. In an example embodiment, the architecture 500 includes one or more processing elements 504 for executing instructions and retrieving data stored in a storage element 502. The processing element 504 comprises at least one processor. Any suitable processor or processors may be used. For example, the processing element 504 may comprise one or more digital signal processors (DSPs). The storage element 502 can include one or more different types of memory, data storage, or computer-readable storage media devoted to different purposes within the architecture 500. In an example embodiment, the storage element 502 comprises flash memory, random-access memory, disk-based storage, etc. Different portions of the storage element 502, for example, are used for program instructions for execution by the processing element 504, storage of images or other digital works, and/or a removable storage for transferring data to other devices, etc. Additionally, storage element 502 may store various costs, iterative penalty values a, and/or other values determined using the above-described techniques when updating the models by multi-objective ranking system 102.

The storage element 502 may also store software for execution by the processing element 504. An operating system 522 may provide the user with an interface for operating the computing device and may facilitate communications and commands between applications executing on the architecture 500 and various hardware thereof. In an example embodiment, a transfer application 524 is configured to receive images, audio, and/or video from another device (e.g., a mobile device, image capture device, and/or display device) and/or from microphone 570 included in the architecture 500.

When implemented in some user devices, the architecture 500 comprises a display component 506. The display component 506 can comprise one or more light-emitting diodes (LEDs) or other suitable display lamps. Also, in some examples, the display component 506 may comprise, for example, one or more devices such as cathode ray tubes (CRTs), liquid-crystal display (LCD) screens, gas plasma-based flat panel displays, LCD projectors, raster projectors, infrared projectors or other types of display devices, etc. As described herein, display component 506 may be effective to display input images and/or segmentation masks generated in accordance with the various techniques described herein.

The architecture 500 may also include one or more input devices 508 operable to receive inputs from a user. Example input devices 508 include a push button, touch pad, touch screen, wheel, joystick, keyboard, mouse, trackball, keypad, light gun, game controller, or any other such device or element whereby a user can provide inputs to the architecture 500. These input devices 508 may be incorporated into the architecture 500 or operably coupled to the architecture 500 via wired or wireless interface. In some examples, architecture 500 may include a microphone 570 or an array of microphones for capturing sounds, such as voice requests. In various examples, audio captured by microphone 570 may be streamed to external computing devices via communication interface 512.

When the display component 506 includes a touch-sensitive display, the input devices 508 can include a touch sensor that operates in conjunction with the display component 506 to permit users to interact with the image displayed by the display component 506 using touch inputs (e.g., with a finger or stylus). The architecture 500 may also include a power supply 514, such as a wired alternating current (AC) converter, a rechargeable battery operable to be recharged through conventional plug-in approaches, or through other approaches such as capacitive or inductive charging.

In an embodiment, the communication interface 512 comprises one or more wired or wireless components operable to communicate with one or more other computing devices. For example, the communication interface 512 may comprise a wireless communication module 536 configured to communicate on a network, such as the network 104, according to any suitable wireless protocol, such as IEEE 802.11 or another suitable wireless local area network (WLAN) protocol. In an embodiment, a short range interface 534 is configured to communicate using one or more short range wireless protocols such as, for example, near field communications (NFC), Bluetooth®, Bluetooth LE, etc. In an embodiment, a mobile interface 540 is configured to communicate utilizing a cellular or other mobile protocol. A Global Positioning System (GPS) interface 538 may be in communication with one or more earth-orbiting satellites or other suitable position-determining systems to identify a position of the architecture 500. In an embodiment, a wired communication module 542 is configured to communicate according to the USB protocol or any other suitable protocol.

The architecture 500 may also include one or more sensors 530 such as, for example, one or more position sensors, image sensors, and/or motion sensors. A microphone 570 is shown in FIG. 5, by way of example.

As noted above, multiple devices may be employed in a single system. In such a multi-device system, each of the devices may include different components for performing different aspects of the system's processing. The multiple devices may include overlapping components. The components of the multi-objective ranking system 102, as described herein, are exemplary, and may be located as a stand-alone device or may be included, in whole or in part, as a component of a larger device or system.

Figure 6:
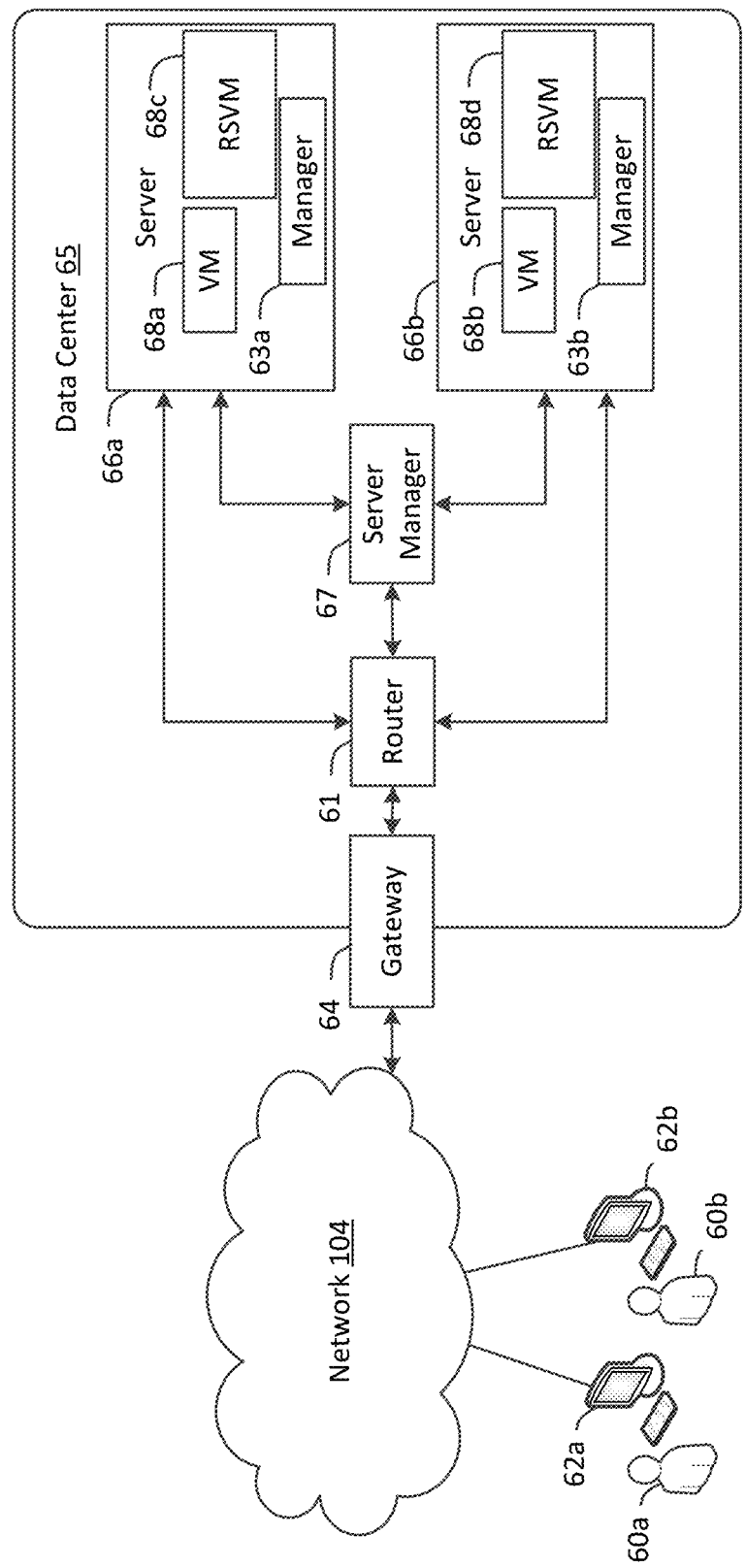
FIG. 6 is a diagram illustrating an example system for sending and providing data that may be used in accordance with the present disclosure.

An example system for sending and providing data and performing various computer processing techniques will now be described in detail. In particular, FIG. 6 illustrates an example computing environment in which the embodiments described herein may be implemented. For example, the computing environment of FIG. 6 may be used to provide ranking of search results as a service over a network wherein one or more of the techniques described herein may be requested by a first computing device and may be performed by a different computing device configured in communication with the first computing device over a network. FIG. 6 is a diagram schematically illustrating an example of a data center 65 that can provide computing resources to users 60a and 60b (which may be referred herein singularly as user 60 or in the plural as users 60) via user computers 62a and 62b (which may be referred herein singularly as user computer 62 or in the plural as user computers 62) via network 104. Data center 65 may be configured to provide computing resources for executing applications on a permanent or an as-needed basis. The computing resources provided by data center 65 may include various types of resources, such as gateway resources, load balancing resources, routing resources, networking resources, computing resources, volatile and non-volatile memory resources, content delivery resources, data processing resources, data storage resources, data communication resources and the like. Each type of computing resource may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. In various examples, the instances may be configured to execute one or more techniques of the multi-objective ranking system 102, as described herein.

These services may be configurable with set or custom applications and may be configurable in size, execution, cost, latency, type, duration, accessibility and in any other dimension. These web services may be configured as available infrastructure for one or more clients and can include one or more applications configured as a system or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols, such as transmission control protocol (TCP), and less reliable transport layer protocols, such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 65 may include servers 66a and 66b (which may be referred herein singularly as server 66 or in the plural as servers 66) that provide computing resources. These resources may be available as bare metal resources or as virtual machine instances 68a-d (which may be referred herein singularly as virtual machine instance 68 or in the plural as virtual machine instances 68). In at least some examples, server manager 67 may control operation of and/or maintain servers 66. Virtual machine instances 68c and 68d are rendition switching virtual machine ("RSVM") instances. The RSVM virtual machine instances 68c and 68d may be configured to perform all, or any portion, of the techniques for improved rendition switching and/or any other of the disclosed techniques in accordance with the present disclosure and described in detail above. As should be appreciated, while the particular example illustrated in FIG. 6 includes one RSVM virtual machine in each server, this is merely an example. A server may include more than one RSVM virtual machine or may not include any RSVM virtual machines.

The availability of virtualization technologies for computing hardware has afforded benefits for providing large scale computing resources for customers and enabling computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that span multiple distinct physical computing systems.

Referring to FIG. 6, network 104 may, for example, be a publicly accessible network of linked networks and possibly operated by various distinct parties, such as the Internet. In other embodiments, network 104 may be a private network, such as a corporate or university network that is wholly or partially inaccessible to non-privileged users. In still other embodiments, network 104 may include one or more private networks with access to and/or from the Internet.

Network 104 may provide access to user computers 62. User computers 62 may be computers utilized by users 60 or other customers of data center 65. For instance, user computer 62a or 62b may be a server, a desktop or laptop personal computer, a tablet computer, a wireless telephone, a personal digital assistant (PDA), an e-book reader, a game console, a set-top box or any other computing device capable of accessing data center 65. User computer 62a or 62b may connect directly to the Internet (e.g., via a cable modem or a Digital Subscriber Line (DSL)). Although only two user computers 62a and 62b are depicted, it should be appreciated that there may be multiple user computers.

User computers 62 may also be utilized to configure aspects of the computing resources provided by data center 65. In this regard, data center 65 might provide a gateway or web interface through which aspects of its operation may be configured through the use of a web browser application program executing on user computer 62. Alternately, a stand-alone application program executing on user computer 62 might access an application programming interface (API) exposed by data center 65 for performing the configuration operations. Other mechanisms for configuring the operation of various web services available at data center 65 might also be utilized.

Servers 66 shown in FIG. 6 may be servers configured appropriately for providing the computing resources described above and may provide computing resources for executing one or more web services and/or applications. In one embodiment, the computing resources may be virtual machine instances 68. In the example of virtual machine instances, each of the servers 66 may be configured to execute an instance manager 63a or 63b (which may be referred herein singularly as instance manager 63 or in the plural as instance managers 63) capable of executing the virtual machine instances 68. The instance managers 63 may be a virtual machine monitor (VMM) or another type of program configured to enable the execution of virtual machine instances 68 on server 66, for example. As discussed above, each of the virtual machine instances 68 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 65 shown in FIG. 6, a router 61 may be utilized to interconnect the servers 66a and 66b. Router 61 may also be connected to gateway 64, which is connected to network 104. Router 61 may be connected to one or more load balancers, and alone or in combination may manage communications within networks in data center 65, for example, by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 65 shown in FIG. 6, a data center 65 is also employed to at least in part direct various communications to, from and/or between servers 66a and 66b. While FIG. 6 depicts router 61 positioned between gateway 64 and data center 65, this is merely an exemplary configuration. In some cases, for example, data center 65 may be positioned between gateway 64 and router 61. Data center 65 may, in some cases, examine portions of incoming communications from user computers 62 to determine one or more appropriate servers 66 to receive and/or process the incoming communications. Data center 65 may determine appropriate servers to receive and/or process the incoming communications based on factors such as an identity, location or other attributes associated with user computers 62, a nature of a task with which the communications are associated, a priority of a task with which the communications are associated, a duration of a task with which the communications are associated, a size and/or estimated resource usage of a task with which the communications are associated and many other factors. Data center 65 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 65 described in FIG. 6 is merely illustrative and that other implementations might be utilized. It should also be appreciated that a server, gateway or other computing device may comprise any combination of hardware or software that can interact and perform the described types of functionality, including without limitation: desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities.

A network set up by an entity, such as a company or a public sector organization, to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment and the like, used to implement and distribute the infrastructure and web services offered by the provider network. The resources may in some embodiments be offered to clients in various units related to the web service, such as an amount of storage capacity for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, for example computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution systems (such as application server instances, Java™ virtual machines (JVMs), general-purpose or special-purpose operating systems, systems that support various interpreted or compiled programming languages such as Ruby, Perl, Python, C, C++ and the like or high-performance computing systems) suitable for the applications, without, for example, requiring the client to access an instance or an execution platform directly. A given execution system may utilize one or more resource instances in some implementations; in other implementations, multiple execution systems may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Although various systems described herein may be embodied in software or code executed by general purpose hardware as discussed above, as an alternate the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits having appropriate logic gates, or other components, etc. Such technologies are generally well known by those of ordinary skill in the art and consequently, are not described in detail herein.

The flowcharts and methods described herein show the functionality and operation of various implementations. If embodied in software, each block or step may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processing component in a computer system. If embodied in hardware, each block may represent a circuit or a number of interconnected circuits to implement the specified logical function(s).

Although the flowcharts and methods described herein may describe a specific order of execution, it is understood that the order of execution may differ from that which is described. For example, the order of execution of two or more blocks or steps may be scrambled relative to the order described. Also, two or more blocks or steps may be executed concurrently or with partial concurrence. Further, in some embodiments, one or more of the blocks or steps may be skipped or omitted. It is understood that all such variations are within the scope of the present disclosure.

Also, any logic or application described herein that comprises software or code can be embodied in any non-transitory computer-readable medium or memory for use by or in connection with an instruction execution system such as a processing component in a computer system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system. The computer-readable medium can comprise any one of many physical media such as magnetic, optical, or semiconductor media. More specific examples of a suitable computer-readable media include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments of the present disclosure are merely possible examples of implementations set forth for a clear understanding of the principles of the disclosure. Many variations and modifications may be made to the above-described example(s) without departing substantially from the spirit and principles of the disclosure. All such modifications and variations are intended to be included herein within the scope of this disclosure and protected by the following claims.

What is claimed is:

1. A computer-implemented method of updating a machine learning model based on multiple objectives, the method comprising:

determining, for a first search query, a first set of products;

determining, by at least one computing device, a first objective for ranking the first set of products in response to the first search query;

determining, by the at least one computing device, a second objective for ranking the first set of products in response to the first search query;

determining a first label for the first set of products, the first label associated with the first objective;

determining a second label for the first set of products, the second label associated with the second objective;

determining, for a first product of the first set of products, a first value of the first label, the first value of the first label being associated with a measure of the first objective for the first product;

determining, for the first product of the first set of products, a first value of the second label, the first value of the second label being associated with a measure of the second objective for the first product;

selecting, by the at least one computing device, from among the first label and the second label, the first label for a first training instance for training the machine learning model for ranking products in response to search queries, the first training instance comprising data representing the first search query and the first set of products, wherein the first label is selected for the first training instance according to a first probability distribution; and determining, by the at least one computing device, parameters of the machine learning model by minimizing a first difference between a first prediction of the machine learning model and the first value of the first label.

2. The computer-implemented method of claim 1, further comprising:

determining, for a second product of a second set of products, a first value of the second label, the first value of the second label for the second product being associated with a measure of the second objective for the second product; and selecting the second label for a second training instance for training the machine learning model, the second training instance comprising data representing a second search query and the second set of products, wherein the parameters of the machine learning model are further determined by minimizing a second difference between a second prediction of the machine learning model and the first value of the second label for the second product.

3. The computer-implemented method of claim 2, further comprising:

determining a first probability for selecting the first label for a third training instance;

determining a second probability for selecting the second label for the third training instance; and selecting between the first label and the second label for the third training instance using the first probability and the second probability.

4. The computer-implemented method of claim 1, wherein the machine learning model is a first machine learning model, the method further comprising:

determining, by a second machine learning model optimized for the first objective using single objective optimization, a first ranking score for the first set of products;

determining, by a third machine learning model optimized for the second objective using single objective optimization, a second ranking score for the first set of products;

inputting the first ranking score and the second ranking score into the first machine learning model; and generating, by the first machine learning model, a third ranking score for the first set of products.

5. A method comprising:

determining a first set of search results;

determining, by at least one computing device, a first objective for ranking the first set of search results;

determining, by the at least one computing device, a second objective for ranking the first set of search results;

determining a probability distribution defining a first probability of training instances to include a first label associated with the first objective and a second probability of training instances to include a second label associate with the second objective;

selecting from among the first label and the second label for training instances of a training data set such that relative proportions of the training instances with the first label and training instances with the second label conforms to the probability distribution, wherein the selecting comprises:

selecting, by the at least one computing device for a first training data instance, the first label; and selecting, by the at least one computing device, for a second training data instance, the second label; and generating a first machine learning model using the first training data instance and the second training data instance, wherein the first machine learning model is effective to rank the first set of search results based at least in part on the first objective and the second objective.

6. The method of claim 5, further comprising selecting between the first label and the second label for a third training data instance based at least in part on the first probability of including the first label and the second probability of including the second label.

7. The method of claim 5, further comprising:

determining the first set of search results based at least in part on a first search query; and selecting between the first label and the second label for the first set of search results and the first search query.

8. The method of claim 5, further comprising:

determining, by a second machine learning model optimized for the first objective, a first ranking score for the first set of search results;

determining, by a third machine learning model optimized for the second objective, a second ranking score for the first set of search results;

inputting the first ranking score and the second ranking score into the first machine learning model; and generating, by the first machine learning model, a third ranking score for the first set of search results.

9. The method of claim 5, further comprising determining a Pareto frontier of solutions for the first machine learning model, wherein the solutions are Pareto optimal for the first objective and the second objective.

10. The method of claim 9, further comprising determining, using the Pareto frontier, the probability distribution for stochastically selecting between the first label and the second label to generate a training instance for the first machine learning model.

11. The method of claim 5, further comprising:

selecting, for each training instance of a set of training instances, a single label associated with a training objective for ranking the first set of search results; and determining parameters of the first machine learning model based at least in part on the set of training instances.

12. A system, comprising:

at least one processor; and at least one non-transitory, computer-readable memory storing instructions that, when executed by the at least one processor are effective to program the at least one processor to:

determine a first set of search results;

determine a first objective for ranking the first set of search results;

determine a second objective for ranking the first set of search results;

determine a probability distribution defining a first probability of training instances to include a first label associated with the first objective and a second probability of training instances to include a second label associate with the second objective;

select from among the first label and the second label for training instances of a training data set such that relative proportions of the training instances with the first label and training instances with the second label conforms to the probability distribution, wherein the selecting comprises:

select, for a first training data instance, the first label; and select, for a second training data instance, the second label; and generate a first machine learning model using the first training data instance and the second training data instance, wherein the first machine learning model is effective to rank the first set of search results based at least in part on the first objective and the second objective.

13. The system of claim 12, wherein the at least one non-transitory, computer-readable memory stores further instructions that, when executed by the at least one processor are further effective to program the at least one processor to select between the first label and the second label for a third training data instance based at least in part on the first probability of including the first label and the second probability of including the second label.

14. The system of claim 12, wherein the at least one non-transitory, computer-readable memory stores further instructions that, when executed by the at least one processor are further effective to program the at least one processor to:
   determine the first set of search results based at least in part on a first search query; and
   select between the first label and the second label for the first set of search results and the first search query.

15. The system of claim 12, wherein the at least one non-transitory, computer-readable memory stores further instructions that, when executed by the at least one processor are further effective to program the at least one processor to:
   determine, by a second machine learning model optimized for the first objective, a first ranking score for the first set of search results;
   determine, by a third machine learning model optimized for the second objective, a second ranking score for the first set of search results;
   input the first ranking score and the second ranking score into the first machine learning model; and
   generate, by the first machine learning model, a third ranking score for the first set of search results.

16. The system of claim 12, wherein the at least one non-transitory, computer-readable memory stores further instructions that, when executed by the at least one processor are further effective to program the at least one processor to determine a Pareto frontier of solutions for the first machine learning model, wherein the solutions are Pareto optimal for the first objective and the second objective.

17. The system of claim 16, wherein the at least one non-transitory, computer-readable memory stores further instructions that, when executed by the at least one processor are further effective to program the at least one processor to determine, using the Pareto frontier, the probability distribution for stochastically selecting between the first label and the second label to generate a training instance for the first machine learning model.

18. The system of claim 12, wherein the at least one non-transitory, computer-readable memory stores further instructions that, when executed by the at least one processor are further effective to program the at least one processor to:
   select, for each training instance of a set of training instances, a single label associated with a training objective for ranking the first set of search results; and
   determine parameters of the first machine learning model based at least in part on the set of training instances.

* * * * *